(12) United States Patent
Kuboki et al.

(10) Patent No.: US 7,682,736 B2
(45) Date of Patent: Mar. 23, 2010

(54) ELECTROCHEMICAL DEVICE

(75) Inventors: Takashi Kuboki, Tokyo (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1042 days.

(21) Appl. No.: 11/276,843

(22) Filed: Mar. 16, 2006

(65) Prior Publication Data

US 2006/0210876 A1   Sep. 21, 2006

(30) Foreign Application Priority Data

Mar. 17, 2005   (JP)   ............................. 2005-077074

(51) Int. Cl.
*H01M 10/40*   (2006.01)

(52) U.S. Cl. ........................................ 429/188; 429/324

(58) Field of Classification Search ................. 429/188, 429/328, 339
See application file for complete search history.

(56) References Cited

U.S. PATENT DOCUMENTS

| 5,989,743 | A | * | 11/1999 | Yamashita | .................. | 429/129 |
| 6,350,946 | B1 | * | 2/2002 | Miyake et al. | .............. | 136/252 |
| 2002/0110739 | A1 | * | 8/2002 | McEwen et al. | ............. | 429/324 |

FOREIGN PATENT DOCUMENTS

| JP | 6-283157 | 10/1994 |
| JP | 3426869 | 5/2003 |
| JP | 2005-149982 | 6/2005 |

OTHER PUBLICATIONS

U.S. Appl. No. 11/389,206, filed Mar. 27, 2006, Kobayashi et al.
U.S. Appl. No. 11/492,106, filed Jul. 25, 2006, Kishi, et al.
U.S. Appl. No. 11/464,396, filed Aug. 14, 2006, Kishi, et al.
Yixuan Wang, et al., "Theoretical Studies to Understand Surface Chemistry on Carbon Anodes for Lithium-Ion Batteries: Reduction Mechanisms of Ethylene Carbonate", J. Am. Chem. Soc., vol, 123, No. 47, Jun. 19, 2001, pp. 11708-11718.

Takaya Sato, et al., "Ionic liquids containing carbonate solvent as electrolytes for lithium ion cells", Journal of Power Sources 138, Jun. 21, 2004, pp. 253-261.

* cited by examiner

*Primary Examiner*—Dah-Wei D Yuan
*Assistant Examiner*—Jacob Marks
(74) *Attorney, Agent, or Firm*—Oblon, Spivak, McClelland, Maier & Neustadt, L.L.P.

(57) ABSTRACT

An electrochemical device includes a case, a nonaqueous electrolyte filled in the case and containing a room temperature molten salt in an amount of 1 to 50 vol %, a first electrode housed in the case, and a second electrode housed in the case and containing a substance having a lamellar crystal structure. The room temperature molten salt contains a cation represented by formula (1) or formula (2) given below.

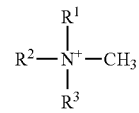

formula (1)

$R^1$ includes a carbonic acid ester group. Each of $R^2$ and $R^3$ denotes a substituent having an acyclic structure and having 4 or less carbon atoms, or $R^2$ and $R^3$ are combined to denote a substituent having a cyclic structure and having 4 or 5 carbon atoms.

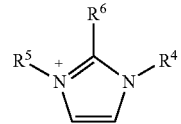

formula (2)

$R^4$ includes a carbonic acid ester group, $R^5$ has an acyclic structure and has 4 or less carbon atoms, and $R^6$ denotes a hydrogen atom or a methyl group.

18 Claims, 1 Drawing Sheet

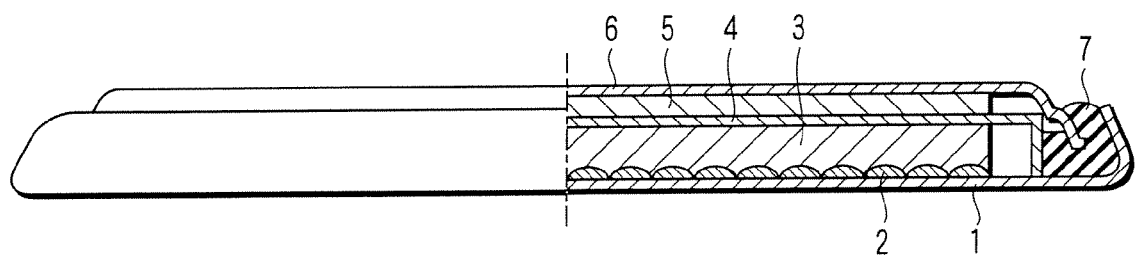
FIGURE

ELECTROCHEMICAL DEVICE

CROSS-REFERENCE TO RELATED APPLICATIONS

This application is based upon and claims the benefit of priority from prior Japanese Patent Application No. 2005-077074, filed Mar. 17, 2005, the entire contents of which are incorporated herein by reference.

BACKGROUND OF THE INVENTION

1. Field of the Invention

The present invention relates to an electrochemical device.

2. Description of the Related Art

In recent years, a lithium ion secondary battery or an electric double layer capacitor is promising as an electrochemical device used as a power source of, for example, electronic equipment or a vehicle.

An organic solvent based nonaqueous electrolyte prepared by dissolving an electrolyte in an organic solvent is used mainly as an nonaqueous electrolyte included in the electrochemical devices referred to above. It should be noted that the organic solvent is combustible. Therefore, in view of the improvement of the safety, various safety devices are mounted to an electrochemical device using an organic solvent based nonaqueous electrolyte, with the result that the volume energy density of the electrochemical device has been caused to be lowered.

Such being the situation, attention is paid to the method of using a nonvolatile room temperature molten salt in place of the volatile organic solvent so as to improve the incombustibility of the nonaqueous electrolyte and thus, to improve the safety of the electrochemical device. The term "room temperature molten salt" noted above denotes a salt consisting of a cation and an anion and capable of assuming a liquid form under room temperature. The room temperature molten salt is featured in having a strong ionic bond and, thus, is nonvolatile and incombustible.

However, in the case of a lithium ion secondary battery using a substance having a lamellar crystal structure, which is represented by a carbonaceous material, as a negative electrode active material, the cationic component of the room temperature molten salt is subjected to a decomposition reaction in the charging stage of the secondary battery, with the result that charge-discharge cycle characteristics of the secondary battery are deteriorated.

Under the circumstances, it is known to the art to suppress the decomposition reaction of the room temperature molten salt by adding additives such as ethylene carbonate (EC) and vinylene carbonate (VC) to the electrolyte used in the electrochemical device, as described in "Takaya Sato, Tatsuya Maruo, Shoko Marukane, and Kentaro Takagi, Journal of Power Sources, 138 (2004) 253-261". The additive such as EC or VC serves to form a film on the negative electrode in the initial charging stage of the secondary battery so as to inhibit the decomposition reaction of the cationic component of the room temperature molten salt.

However, EC, VC, etc. are incapable of forming a film in an amount conforming to the addition amount. Therefore, if EC, VC, etc. are used in amounts large enough to form a satisfactory film on the negative electrode, the nonaqueous electrolyte is caused to contain large amounts of EC, VC, etc. which are not consumed for forming the film. It should be noted in this connection that EC, VC, etc. are combustible so that it gives rise to the problem that the incombustibility of the nonaqueous electrolyte is impaired.

This is also the case with the electric double layer capacitor. Where a carbonaceous material having a lamellar crystal structure is used as the negative electrode material, a decomposition reaction of the room temperature molten salt is generated in the charging stage of the capacitor so that the charge-discharge cycle characteristics of the capacitor is deteriorated.

Jpn. Pat. Appln. KOKAI Publication No. 2005-149982 is intended to provide an electrolyte, which includes a room temperature molten salt having flame incombustibility and is excellent in the mobility of Li ions. The patent document discloses an electrolyte prepared by dissolving a Li salt in a quaternary ammonium salt consisting of a cation and an anion. It is taught that a lithium secondary battery excellent in the capability of acquiring a large capacity during the stage of the large current discharge can be obtained by using the electrolyte thus prepared. The substituent of the quaternary ammonium salt is an alkyl group, an alkoxy group, or a group having a carbonic acid ester structure or a fatty ester structure.

However, it was impossible to obtain excellent charge-discharge cycle characteristics by using the electrolyte disclosed in the patent document quoted above.

BRIEF SUMMARY OF THE INVENTION

An object of the present invention is to provide an electrochemical device exhibiting incombustibility and excellent in the charge-discharge cycle characteristics.

According to an aspect of the present invention, there is provided an electrochemical device, comprising:

a case;

a nonaqueous electrolyte filled in the case and containing a room temperature molten salt in an amount of not smaller than 1% to not larger than 50% by volume, the room temperature molten salt containing a cation represented by formula (1) or formula (2) given below;

a first electrode housed in the case; and a second electrode housed in the case and containing a substance having a lamellar crystal structure;

formula (1)

where $R^1$ denotes a substituent including a carbonic acid ester group; and each of $R^2$ and $R^3$ denotes a substituent having an acyclic structure and having 4 or less carbon atoms, or $R^2$ and $R^3$ are combined to denote a substituent having a cyclic structure and having not less than 4 to not more than 5 carbon atoms;

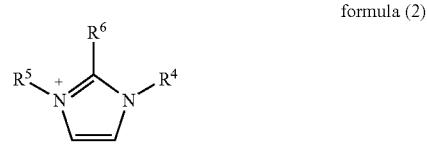

formula (2)

where $R^4$ denotes a substituent including a carbonic acid ester group, $R^5$ denotes a substituent having an acyclic structure and having 4 or less carbon atoms, and $R^6$ denotes a hydrogen atom or a methyl group.

BRIEF DESCRIPTION OF THE SEVERAL VIEWS OF THE DRAWING

The single FIGURE is a cross sectional view, partly broken away, schematically showing the construction of a lithium ion secondary battery according to a first embodiment of the present invention.

DETAILED DESCRIPTION OF THE INVENTION

Each embodiment of the present invention will now be described with reference to the accompanying drawing. Incidentally, the same reference numerals are put to the members of the electrochemical device common with another embodiment of the present invention. Also, overlapping description is omitted. The accompanying drawing is simply intended to illustrate the description and to facilitate understanding of the present invention. It is possible for the shape, size, ratio, etc. shown in the drawing to differ from those of the actual apparatus. Of course, it is possible to change appropriately the design of the electrochemical device such as a lithium ion secondary battery so as to change appropriately the shape, size, ratio, etc. of the secondary battery shown in the drawing in view of the description given below and the known technology.

Each embodiment of the present invention is directed to an electrochemical device comprising a nonaqueous electrolyte containing a room temperature molten salt. The electrochemical device includes, for example, a lithium ion secondary battery and an electric double layer capacitor. The room temperature molten salt consists of a cation and an anion and is capable of assuming a liquid form under room temperature (15 to 25° C.).

First Embodiment

A lithium ion secondary battery according to a first embodiment of the present invention will now be described with reference to FIGURE. Specifically, FIGURE is a cross sectional view, partly broken away, schematically showing the construction of a lithium ion secondary battery according to the first embodiment of the present invention. Incidentally, the lithium ion secondary battery showing in FIGURE is in coin shape.

As shown in the drawing, the lithium ion secondary battery comprises a case 1. A positive electrode current collector 2 is placed on the inner bottom of the case 1. Also, a positive electrode 3 is housed in the case 1. The positive electrode 3 is electrically connected to the case 1 via the positive electrode current collector 2. On the other hand, a negative electrode 5 is electrically connected to a negative electrode sealing plate 6 that also acts as a negative electrode current collector. The negative electrode sealing plate 6 is fixed to an opening of the case 1 via an insulating gasket 7. The positive electrode 3 and the negative electrode 5 are positioned to face each other with a separator 4 interposed therebetween. The case 1 and the negative electrode sealing plate 6 are electrically insulated from each other by the presence of the insulating gasket 7. Also, a coin type secondary battery is hermetically sealed by the insulating gasket 7. Further, a nonaqueous electrolyte is present in the separator 4, in the positive electrode 3, in the negative electrode 5 or in the clearance inside the coin type secondary battery.

The nonaqueous electrolyte, the negative electrode, the positive electrode, the separator, and the case will now be described in detail.

i) Nonaqueous Electrolyte

The nonaqueous electrolyte used in the first embodiment of the present invention is featured in that the nonaqueous electrolyte contains a room temperature molten salt containing a cation represented by formula (1) or formula (2) given below. Incidentally, the stereoisomerism is not defined in respect to formula (1). Also, the resonance structure is not defined in respect to formula (2). Further, substituent $R^4$ and substituent $R^5$ are interchangeable.

formula (1)

where $R^1$ denotes a substituent including a carbonic acid ester group; and each of $R^2$ and $R^3$ denotes a substituent having an acyclic structure and having 4 or less carbon atoms, or $R^2$ and $R^3$ are combined to denote a substituent having a cyclic structure and having 4 or 5 carbon atoms;

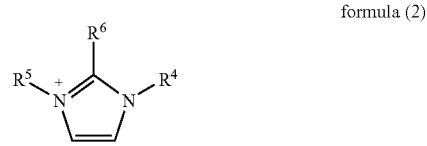

formula (2)

where $R^4$ denotes a substituent including a carbonic acid ester group, $R^5$ denotes a substituent having an acyclic structure and having 4 or less carbon atoms, and $R^6$ denotes a hydrogen atom or a methyl group.

According to the first embodiment of the present invention, the cation represented by formula (1) or formula (2) given above is capable of forming a stable film on the negative electrode in the initial charging stage of the secondary battery. The film-forming reaction performed by the cation is considered to be derived from the carbonic acid ester group. To be more specific, it is considered reasonable to understand that the carbonic acid ester group is decomposed like EC on the surface of the negative electrode in the initial charging stage of the secondary battery so as to form a film of, for example, lithium carbonate on the surface of the negative electrode (see, for example, "Takaya Sato, Tatsuya Maruo, Shoko Marukane, and Kentaro Takagi, Journal of Power Sources, 138 (2004) 253-261". Therefore, after formation of the film, it is possible to inhibit the decomposition reaction of the room temperature molten salt that is caused by the substance having a lamellar crystal structure, with the result that it is possible to improve the charge-discharge cycle characteristics of the lithium ion secondary battery.

It is possible for the lithium ion secondary battery according to the first embodiment of the present invention to include a positive electrode containing a substance having a lamellar crystal structure. According to the first embodiment of the present invention, it is possible to improve the charge-discharge cycle characteristics of the lithium ion secondary battery in this case, too. The particular effect is considered to be derived from the mechanism similar to that described above.

It is desirable for $R^1$ or $R^4$ in formula (1) or formula (2) to denote the substituent represented by formula (3) or formula (4) given below:

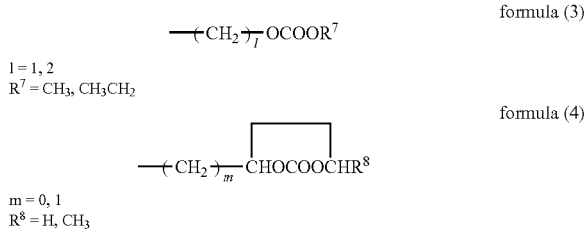

$$\text{—}(CH_2)_l\text{—}OCOOR^7 \quad \text{formula (3)}$$
$l = 1, 2$
$R^7 = CH_3, CH_3CH_2$ $$\text{—}(CH_2)_m\text{—}CHOCOOCHR^8 \quad \text{formula (4)}$$
$m = 0, 1$
$R^8 = H, CH_3$ It is possible for the substituent represented by formula (3) or formula (4) given above to form a very stable film on the negative electrode or on the positive electrode.

Particularly, it is desirable for $R^1$ or $R^4$ to be a substituent represented by formula (4), and for $R^8$ to denote a hydrogen atom. In this case, it is possible to form a particularly dense and stable film on the negative electrode or on the positive electrode.

It is desirable for "m" in formula (4) to be zero (0). In this case, it is possible to promote the formation of a particularly good film on the electrodes.

$R^2$ and $R^3$ in formula (1) will now be described in detail.

The term "substituent having an acyclic structure and having 4 or less carbon atoms" for each of $R^2$ and $R^3$ generally denotes a substituent selected from the group consisting of an alkyl group, an ether group and an ester group.

To be more specific, the substituent for each of $R^2$ and $R^3$ includes, for example, a methyl group, an ethyl group, a propyl group, an isopropyl group, a butyl group, an isobutyl group, a tert-butyl group, a sec-butyl group, a methoxy methyl group, a methoxy ethyl group, a methoxy propyl group, (2-methoxy) propyl group, an ethoxy methyl group, an ethoxy ethyl group, a methoxy carbonyl methyl group, a methoxy carbonyl ethyl group, an ethoxy carbonyl methyl group, an acetyl methyl group, an acetyl ethyl group and a propionyl methyl group.

Particularly, it is desirable for each of $R^2$ and $R^3$ to denote a substituent consisting of an alkyl group alone, an ether group alone, or an alkyl group and an ether group. It is more desirable for each of $R^2$ and $R^3$ to denote a substituent consisting of an alkyl group alone.

To be more specific, it is desirable for $R^2$ to be selected from the group consisting of a methyl group, an ethyl group, a propyl group, an isopropyl group, (2-methoxy) propyl group, a butyl group, an isobutyl group, a sec-butyl group and a tert-butyl group. On the other hand, it is desirable for $R^3$ to be selected from the group consisting of a methyl group and an ethyl group.

In general, each of the alkyl group, the ether group and the ester group influences the viscosity of the molten salt. These atomic groups are in the order of ester group>ether group>alkyl group, if arranged in the order of the intensity of the interaction among the substituents. In other words, the order given above denotes the order in the viscosity of the molten salt containing the cation including the particular atomic groups. It should be noted that the conductivity of the molten salt is determined by the viscosity of the molten salt. Such being the situation, it is desirable for each of $R^2$ and $R^3$ to be selected from the substituents given above, which are mainly selected from the alkyl groups having a low viscosity.

The term "substituent having a cyclic structure and having not less than 4 to not more than 5 carbon atoms" for combined $R^2$ and $R^3$ generally denotes a substituent selected from the group consisting of a cyclic alkyl group and a cyclic ether group.

To be more specific, it is desirable for the substituent combined $R^2$ and $R^3$ to be selected from the group consisting of a pyrrolidyl group, a piperidyl group and a morpholyl group. Particularly, it is desirable for the substituent combined $R^2$ and $R^3$ to be selected from a pyrrolidyl group and a piperidyl group, which are kinds of a cyclic alkyl group. These substituents contribute to the improvement in the conductivity and to the improvement in the solubility of the lithium salt. Also, it is desirable for a substituent $R^2$ and a substituent $R^3$ to be bonded to each other so as to form a cyclic structure because the viscosity of the room temperature molten salt can be lowered in this case.

$R^5$ in formula (2) will now be described in detail.

The term "substituent having an acyclic structure and having 4 or less carbon atoms" for $R^5$ in formula (2) is equal to that for each of $R^2$ and $R^3$ in formula (1). Particularly, it is desirable for $R^5$ to denote a methyl group. Where $R^5$ denotes a methyl group, the viscosity of the room temperature molten salt can be lowered.

The desirable cations represented by formula (1) or formula (2) will now be described more concretely.

Specifically, among the cations represented by formula (1) defined above, it is desirable for $R^2$ to denote a substituent selected from the group consisting of a methyl group, an ethyl group, a propyl group, an isopropyl group, a (2-methoxy) propyl group, a butyl group, an isobutyl group, a sec-butyl group and a tert-butyl group, for $R^3$ to denote a substituent selected from the group consisting of a methyl group and an ethyl group, for $R^1$ to denote a substituent represented by formula (4) given above, where m is 0 or 1, and for $R^8$ to denote a hydrogen atom. These cations are represented by formula (5) given below.

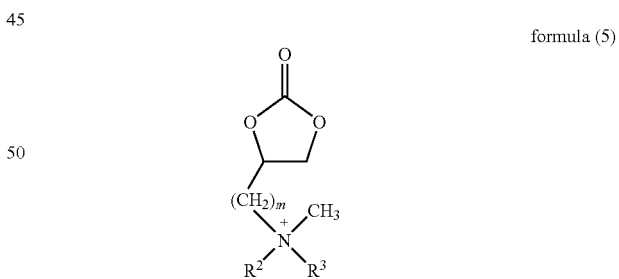

formula (5)

$m = 0, 1$
$R^2 = CH_3, CH_3CH_2, CH_3(CH_2)_2, (CH_3)_2CH, CH_3O(CH_2)_2, CH_3(CH_2)_3,$
$CH_3CH_2(CH_3)CH, (CH_3)_2CHCH_2, (CH_3)_3C$
$R^3 = CH_3, CH_3CH_2$

Specifically, among the cations represented by formula (1) defined above, it is also desirable for $R^2$ and $R^3$ to be combined to denote a substituent selected from the group consisting of a pyrrolidyl group and a piperidyl group, for $R^1$ to denote a substituent represented by formula (4) given above, where m is 0 or 1, and for $R^8$ to denote a hydrogen atom. These cations are represented by formula (6) given below.

formula (6)

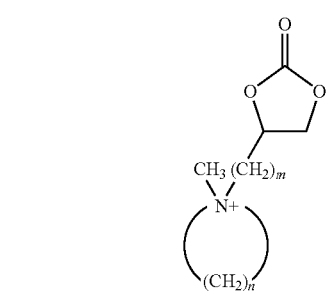

n = 4, 5; m = 0, 1

Furthermore, specifically among the cations represented by formula (1) defined above, it is desirable for $R^2$ to denote a substituent selected from the group consisting of a methyl group, an ethyl group, a propyl group, an isopropyl group, a (2-methoxy) propyl group, a butyl group, an isobutyl group, a sec-butyl group and a tert-butyl group, for $R^3$ to denote a substituent selected from the group consisting of a methyl group and an ethyl group, for $R^1$ to denote a substituent represented by formula (3) given above, where l is 1 or 2, and for $R^7$ to denote a methyl group or an ethyl group. These cations are represented by formula (7) given below.

formula (7)

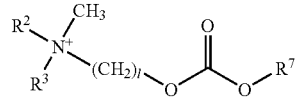

l = 1, 2
$R^2$ = CH$_3$, CH$_3$CH$_2$, CH$_3$(CH$_2$)$_2$, (CH$_3$)$_2$CH, CH$_3$O(CH$_2$)$_2$, CH$_3$(CH$_2$)$_3$, CH$_3$CH$_2$(CH$_3$)CH, (CH$_3$)$_2$CHCH$_2$, (CH$_3$)$_3$C
$R^7$ = CH$_3$, CH$_3$CH$_2$
$R^3$ = CH$_3$, CH$_3$CH$_2$

Furthermore, specifically among the cations represented by formula (1) defined above, it is also desirable for $R^2$ and $R^3$ to be combined to denote a substituent selected from the group consisting of a pyrrolidyl group and a piperidyl group, for $R^1$ to denote a substituent represented by formula (3) given above, where l is 1 or 2, and for $R^8$ to denote a methyl group or an ethyl group. These cations are represented by formula (8) given below.

formula (8)

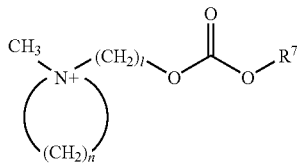

n = 4, 5; l = 1, 2
$R^7$ = CH$_3$, CH$_3$CH$_2$

Specifically, among the cations represented by formula (2) defined above, it is desirable for $R^5$ to denote a methyl group. Among these cations, it is desirable for $R^5$ to denote a methyl group, for $R^4$ to denote a substituent represented by formula (4) given above, where m is 0 or 1, and for $R^8$ to denote a hydrogen atom. These cations are represented by formula (9) given below.

formula (9)

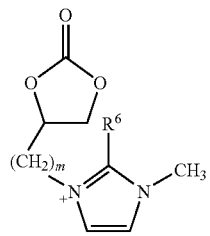

m = 0, 1
$R^6$ = H, CH$_3$

Furthermore, specifically among the cations represented by formula (2) given above, it is desirable for $R^5$ to denote a methyl group, for $R^4$ to denote a substituent represented by formula (3) given above, where l is 1 or 2, and for $R^7$ to denote a methyl group or an ethyl group. These cations are represented by formula (10) given below.

formula (10)

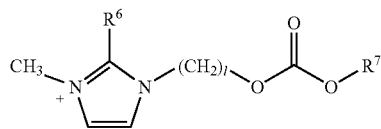

l = 1, 2
$R^6$ = H, CH$_3$
$R^7$ = CH$_3$, CH$_3$CH$_2$

The counter anions of the cations represented by formula (1) or formula (2) include, for example, $PF_6^-$, $[PF_3(C_2F_5)_3]^-$, $[PF_3(CF_3)_3]^-$, $BF_4^-$, $[BF_2(CF_3)_2]^-$, $[BF_2(C_2F_5)_2]^-$, $[BF_3(CF_3)]^-$, $[BF_3(C_2F_5)]^-$, $[B(COOCOO)_2]^-$ (abbreviation of BOB$^-$), $CF_3SO_3^-$ (abbreviation of Tf$^-$), $C_4F_9SO_3^-$ (abbreviation of Nf$^-$), $[(CF_3SO_2)_2N]^-$ (abbreviation of TFSI$^-$), $[(C_2F_5SO_2)_2N]^-$ (abbreviation of BETI$^-$), $[(CF_3SO_2)(C_4F_9SO_2)N]^-$, $[(CN)_2N]^-$ (abbreviation of DCA$^-$), $[(CF_3SO_2)_3C]^-$, and $[(CN)_3C]^-$.

Particularly, it is desirable for the counter anions of the cations represented by formula (1) or formula (2) to be selected from the group consisting of $BF_4^-$, $[BF_3(CF_3)]^-$, $[BF_3(C_2F_5)]^-$, BOB$^-$, TFSI$^-$, and BETI$^-$. In this case, the viscosity of the room temperature molten salt is particularly lowered and the room temperature molten salt is stabilized chemically and electrochemically.

It is possible to use a single kind of the room temperature molten salt containing the cation represented by formula (1) or formula (2). It is also possible to use a mixture containing a plurality of different kinds of the room temperature molten salts.

It is possible for the nonaqueous electrolyte to contain an additional room temperature molten salt consisting of an organic cation given below and an anion in various kinds, in addition to the room temperature molten salts given above.

Incidentally, the "additional room temperature molten salt" noted above consists of an organic cation and an anion in various kinds and is capable of assuming a liquid form at room temperature (15 to 25° C.).

The organic cations of the "additional room temperature molten salt" include, for example, N,N,N-trimethyl butyl ammonium ion, N-ethyl-N,N-dimethyl propyl ammonium ion, N-ethyl-N,N-dimethyl butyl ammonium ion, N,N-dimethyl-N-propyl butyl ammonium ion, N-(2-methoxy ethyl)-N,N-dimethyl ethyl ammonium ion, 1-ethyl-3-methyl imidazolium ion, 1-methyl-3-propyl imidazolium ion, 1-butyl-3-methyl imidazolium ion, 1-ethyl-2,3-dimethyl imidazolium ion, 1-ethyl-3,4-dimethyl imidazolium ion, 1-ethyl-2,3,4-trimethyl imidazolium ion, 1-ethyl-2,3,5-trimethyl imidazolium ion, N-methyl-N-propyl pyrrolidinium ion, N-butyl-N-methyl pyrrolidinium ion, N-sec-butyl-N-methyl pyrrolidinium ion, N-(2-methoxy ethyl)-N-methyl pyrrolidinium ion, N-(2-ethoxy ethyl)-N-methyl pyrrolidinium ion, N-methyl-N-propyl piperidinium ion, N-butyl-N-methyl piperidinium ion, N-sec-butyl-N-methyl piperidinium ion, N-(2-methoxy ethyl)-N-methyl piperidinium ion, and N-(2-ethoxy ethyl)-N-methyl piperidinium ion. Particularly, it is desirable for the organic cation to be selected from the group consisting of N,N,N-trimethyl butyl ammonium ion, N-ethyl-N,N-dimethyl propyl ammonium ion, N-ethyl-N,N-dimethyl butyl ammonium ion, N-(2-methoxy ethyl)-N,N-dimethyl ethyl ammonium ion, 1-ethyl-3-methyl imidazolium ion, 1-ethyl-2,3-dimethyl imidazolium ion, N-methyl-N-propyl pyrrolidinium ion, N-butyl-N-methyl pyrrolidinium ion, N-methyl-N-propyl piperidinium ion, and N-butyl-N-methyl piperidinium ion.

The anions of the "additional room temperature molten salt" include, for example, $PF_6^-$, $[PF_3(C_2F_5)_3]^-$, $[PF_3(CF_3)_3]^-$, $BF_4^-$, $[BF_2(CF_3)_2]^-$, $[BF_2(C_2F_5)_2]^-$, $[BF_3(CF_3)]^-$, $[BF_3(C_2F_5)]^-$, $BOB^-$, $Tf^-$, $Nf^-$, $TFSI^-$, $BETI^-$, $[(CF_3SO_2)(C_4F_9SO_2)N]^-$, $DCA^-$, $[(CF_3SO_2)_3C]^-$, and $[(CN)_3C]^-$.

It is possible for the anion of the "additional room temperature molten salt" to be equal to or to differ from the counter anion of the cation represented by formula (1) or formula (2). Also, it is possible to use a single kind of the "additional room temperature molten salt" described above. It is also possible to use a mixture containing a plurality of different kinds of the "additional room temperature molten salts" described above.

It is desirable for the room temperature molten salt containing the cation represented by formula (1) or formula (2) to be contained in an amount of not smaller than 1% by volume based on the amount of the nonaqueous electrolyte. In this case, it is possible to obtain a sufficient effect of forming a film on the surface of the negative electrode or the positive electrode. Also, it is desirable for the amount of the room temperature molten salt to be not larger than 50% by volume based on the amount of the nonaqueous electrolyte. In this case, it is possible to suppress the elevation of the viscosity of the nonaqueous electrolyte so as to improve the charge-discharge cycle characteristics. It is also possible to obtain high discharge capacity and improve the large current discharge characteristics of the lithium ion secondary battery. It is desirable for the remainder of the nonaqueous electrolyte to be formed of the additional room temperature molten salt noted above and a lithium salt. In this case, it is possible to improve the discharge characteristics of the secondary battery while maintaining the incombustibility.

It is more desirable for the room temperature molten salt containing the cation represented by formula (1) or formula (2) to be contained in an amount of not smaller than 3% to not larger than 50% by volume based on the amount of the nonaqueous electrolyte. If the room temperature molten salt is contained in an amount not smaller than 3% by volume, it is possible to permit the film formation to proceed rapidly. It is more desirable for the room temperature molten salt to be contained in an amount of not smaller than 5% to not larger than 20% by volume based on the amount of the nonaqueous electrolyte.

The lithium salts dissolved in the room temperature molten salt include, for example, $LiPF_6$, $Li[PF_3(C_2F_5)_3]$, $Li[PF_3(CF_3)_3]$, $LiBF_4$, $Li[BF_2(CF_3)_2]$, $Li[BF_2(C_2F_5)_2]$, $Li[BF_3(CF_3)]$, $Li[BF_3(C_2F_5)]$, LIBOB, LiTf, LiNf, LiTFSI, LiBETI, $Li[(CF_3SO_2)(C_4F_9SO_2)N]$, LIDCA, $Li[(CF_3SO_2)_3C]$, and $Li[(CN)_3C]$. Particularly, it is desirable for the lithium salt to be selected from the group consisting of $LiBF_4$, $Li[BF_3(CF_3)]$, $Li[BF_3(C_2F_5)]$, LIBOB, LITFSI and LiBETI. Incidentally, it is possible for the anion of the lithium salt to be equal to or to differ from the anion of the room temperature molten salt.

It is desirable for the lithium salt concentration in the nonaqueous electrolyte to be not lower than 0.2 M to not higher than 4 M. If the lithium salt concentration is not lower than 0.2 M, the lithium ion conductivity is improved so that it is possible to improve the large current discharge characteristics of the secondary battery. Also, if the lithium salt concentration is not higher than 4 M, the lithium salt can be dissolved sufficiently in the nonaqueous electrolyte. Particularly, it is desirable for the lithium salt concentration in the nonaqueous electrolyte to fall within not lower than 0.5 M to not higher than 2.5 M.

ii) Negative Electrode

In the first embodiment of the present invention, at least one of the negative electrode and the positive electrode contains a substance having a lamellar crystal structure. In the case where the negative electrode contains the substance having a lamellar crystal structure, the substance having a lamellar crystal structure is contained as a negative electrode active material or as an electronic conductor. Incidentally, the effect according to the first embodiment of the present invention can be produced more prominently in the case where a substance having a lamellar crystal structure is contained in the negative electrode as a negative electrode active material because the negative electrode active material is contained in the negative electrode in a larger amount.

The substance having a lamellar crystal structure includes, for example, a carbonaceous material and lithium titanium oxide. In the case where the carbonaceous material constitutes the substance having a lamellar crystal structure, the decomposition reaction of the room temperature molten salt is rendered more prominent than the case where other material constitutes the substance having a lamellar crystal structure. It follows that, in the case of using a carbonaceous material as a substance having a lamellar crystal structure, the effect produced in the first embodiment of the present invention is rendered particularly prominent.

Incidentally, in the case where the carbonaceous material constitutes the substance having a lamellar crystal structure, a prominent effect is obtained in the case where an interplanar spacing $d_{002}$ of the graphite crystal plane obtained from the X-ray diffraction peak falls within not smaller than 0.33 nm to not larger than 0.40 nm.

The negative electrode can be formed on a negative electrode current collector. In other words, the negative electrode can be prepared by coating a negative electrode current collector with a mixture including a negative electrode active material, a binder and, as required, an electronic conductor. At least one of the negative electrode active material and the electronic conductor included in the mixture contains a substance having a lamellar crystal structure.

The negative electrode active material contained in the negative electrode includes, for example, at least one material selected from the group consisting of a metal oxide, a metal sulfide, a metal nitride, lithium metal, a lithium alloy, a lithium composite oxide and a carbonaceous material capable of intercalating and deintercalating lithium ions.

The metal oxides include, for example, tin oxide, silicon oxide, lithium titanium oxide, niobium oxide, and tungsten oxide.

The metal sulfides include, for example, tin sulfide, and titanium sulfide.

The metal nitrides include, for example, lithium cobalt nitride, lithium iron nitride, and lithium manganese nitride.

The lithium alloys include, for example, a lithium-aluminum alloy, a lithium-tin alloy, a lithium-lead alloy, and a lithium-silicon alloy.

Further, the carbonaceous materials include, for example, graphite, isotropic graphite, coke, a carbon fiber, a spherical carbon, a resin-baked carbon, and a thermally decomposed vapor-grown carbon. Each of these carbonaceous materials has a lamellar crystal structure. Particularly, it is desirable to use the carbon fiber prepared by using a mesophase pitch as the raw material or the spherical carbon as the carbonaceous material because the negative electrode containing the carbonaceous material exhibits a high charging efficiency so that it is possible to improve the charge-discharge cycle characteristics of the secondary battery. Further, it is desirable for the graphite crystals of the carbon fibers prepared by using the mesophase pitch as the raw material or the spherical carbon to be oriented in the radial direction.

It is desirable for the carbonaceous material used as the negative electrode active material to have an interplanar spacing $d_{002}$ of not smaller than 0.3354 nm to not larger than 0.40 nm of the (002) plane of the graphite crystal, which is obtained from the X-ray diffraction peak. If the interplanar spacing $d_{002}$ is not larger than 0.40 nm, it is possible to improve the conductivity of the carbonaceous material and to improve the charge-discharge efficiency of the secondary battery.

It is desirable for the carbonaceous material used as the negative electrode active material to have a specific surface area as determined by the BET method, which is not smaller than 0.5 m$^2$/g. If the specific surface area of the carbonaceous material is not smaller than 0.5 m$^2$/g, it is possible to secure a sufficient contact area between the carbonaceous material and the nonaqueous electrolyte. As a result, it is possible to improve the migrating efficiency of the lithium ions between the carbonaceous material and the nonaqueous electrolyte so that it is possible to improve the large current charge-discharge characteristics of the secondary battery. It is more desirable for the specific surface area of the carbonaceous material to be not smaller than 1 m$^2$/g.

The electronic conductor used in the negative electrode includes, for example, a carbonaceous material such as acetylene black, carbon black or graphite. The graphite has a lamellar crystal structure. It follows that, in the case of using graphite as the electronic conductor in the negative electrode, the effect produced in the first embodiment of the present invention is rendered prominent.

It is desirable for the carbonaceous material used as the electronic conductor to have an interplanar spacing $d_{002}$ of not smaller than 0.3354 nm to not larger than 0.3800 nm of the (002) plane of the graphite crystal, which is obtained from the X-ray diffraction peak. If the interplanar spacing $d_{002}$ is not larger than 0.3800 nm, it is possible to improve the conductivity of the carbonaceous material so as to permit the carbonaceous material to play sufficiently the role of the electronic conductor.

The negative electrode current collector can be formed of a porous conductive substrate or a nonporous conductive substrate, which is electrochemically stable. These conductive substrates can be formed of, for example, copper, stainless steel, or nickel. It is possible to use a mesh, a punched metal or an expanded metal as the porous conductive substrate. Also, the negative electrode formed on a porous conductive substrate can be prepared by allowing a metal foil to support a negative electrode layer containing a negative electrode active material, a binder and, as required, an electronic conductor, followed by punching a hole in the metal foil.

The binder contained in the negative electrode includes, for example, polytetrafluoroethylene (PTFE), polyvinylidene fluoride (PVdF), ethylene-propylene-butadiene rubber (EPBR), styrene-butadiene rubber (SBR), and carboxymethyl cellulose (CMC).

iii) Positive Electrode

In the first embodiment of the present invention, at least one of the negative electrode and the positive electrode contains a substance having a lamellar crystal structure. In the case where the substance having a lamellar crystal structure is contained in the positive electrode, the substance having a lamellar crystal structure is contained as the electronic conductor.

A substance having a lamellar crystal structure includes, for example, a carbonaceous material. Particularly, in the case of using a carbonaceous material as the substance having a lamellar crystal structure, the decomposition reaction of the room temperature molten salt is rendered prominent, compared with the case of using other materials as the substance having a lamellar crystal structure. It follows that, in the case of using a carbonaceous material as a substance having a lamellar crystal structure, the first embodiment of the present invention produces a particularly prominent effect.

The positive electrode can be manufactured by, for example, mixing a positive electrode active material, an electronic conductor and a binder, followed by molding the resultant mixture in the shape of a membrane.

The positive electrode active material used in the first embodiment of the present invention includes, for example, lithium metal oxides such as a lithium cobalt oxide ($Li_xCoO_2$), lithium iron oxide ($Li_xFeO_2$), lithium nickel oxide ($Li_xNiO_2$), lithium nickel cobalt oxide ($Li_xNi_yCo_{1-y}O$; $0<y<1$), and lithium manganese oxide ($Li_xMn_2O_4$); and other metal oxides such as manganese oxide ($MnO_2$), vanadium pentoxide ($V_2O_5$), chromium oxide ($Cr_3O_8$, $CrO_2$), molybdenum trioxide ($MoO_3$), and titanium dioxide ($TiO_2$). In the case of using these metal oxides, it is possible to obtain a lithium ion secondary battery having a high battery voltage and a high capacity. Particularly, in order to obtain a higher battery voltage, it is desirable to use $Li_xCoO_2$, $Li_xFeO_2$, $Li_xNiO_2$, $Li_xNi_yCo_{1-y}O_2$ ($0<y<1$) and $LiMn_2O_4$ In the metal oxides exemplified above, it is desirable for the molar ratio x to satisfy $0 \leq x \leq 2$, in order to improve the reversibility of the charge-discharge reaction. It is more desirable for the molar ratio x to satisfy $0<x<1.1$.

The electronic conductor contained in the positive electrode is equal to that contained in the negative electrode described previously.

The binder contained in the positive electrode includes, for example, polytetrafluoroethylene (PTFE), polyvinylidene fluoride (PVdF), ethylene-propylene-diene terpolymer (EPDM) and styrene-butadiene rubber (SBR).

The positive electrode current collector is formed of, for example, a metal foil or a metal mesh made of, for example, aluminum, stainless steel, nickel, tungsten, titanium or molybdenum. Incidentally, it is possible for the surface of the positive electrode current collector to be covered with an oxidation resistant metal or alloy capable of suppressing the oxidation of the positive electrode current collector.

iv) Separator

It is possible for the separator to be formed of a porous film containing, for example, polyethylene, polypropylene, or polyvinylidene fluoride (PVdF), to be formed of an unwoven fabric made of a synthetic resin, or to be formed of an unwoven fabric made of a glass fiber.

Also, it is possible to use a gel nonaqueous electrolyte as a substitute for the separator. The gel nonaqueous electrolyte can be prepared by dissolving a polymer material in the room temperature molten salt described above having a lithium salt dissolved therein. The polymer materials include, for example, polyethylene oxide (PEO), polyacrylonitrile (PAN), PVdF, polymethacrylic acids, polymethacrylic acid esters, polyacrylic acids and polyacrylic acid esters.

v) Case

It is possible for the case to be formed of a metal container or a container made of a laminate film. A metal can made of aluminum, an aluminum alloy, iron or stainless steel can be used as the metal container forming the case. The metal can, which is in prismatic or cylindrical shape, can be used as the case.

A multi-layered film obtained by covering a metal foil with a resin film can be used as the laminate film for forming the case. The resin film noted above can be formed of a polymer such as polypropylene (PP), polyethylene (PE), Nylon, or polyethylene terephthalate (PET).

It is desirable to use as the case a metal container having a thickness not larger than 0.2 mm or a container formed of a laminate film having a thickness not larger than 0.2 mm.

Second Embodiment

An electric double layer capacitor according to a second embodiment of the present invention will now be described with reference to FIGURE. Incidentally, the following description covers only the portion differing from the first embodiment.

The electric double layer capacitor has a construction similar to that of the lithium ion secondary battery shown in FIGURE. For example, in the case of the electric double layer capacitor, each of the positive electrode 3 and the negative electrode 5 corresponds to a polarizable electrode. In view of the aspect of improving the energy density, it is desirable for the polarizable electrodes respectively corresponding to the positive electrode 3 and the negative electrode 5 to have substantially the same volume. Incidentally, in the case of the electric double layer capacitor, each of the positive electrode current collector 2 and the negative electrode current collector 6 corresponds to a collection electrode.

Each of the polarizable electrodes has a construction substantially equal to that of the positive electrode or the negative electrode described previously. In the case of the electric double layer capacitor, a carbonaceous material is used as the electrode material, which corresponds to the positive or negative electrode active material used in the first embodiment described previously, contained in each of the polarizable electrodes. The carbonaceous material used in the second embodiment includes, for example, a fibrous or granular activated carbon in addition to the carbonaceous materials exemplified previously in conjunction with the first embodiment. Particularly, it is desirable for the carbonaceous material used in the second embodiment to have a specific surface area of not smaller than 600 m$^2$/g, as determined by the BET method.

The effect of the present invention is produced prominently in the case where the electronic conductor contained in the negative electrode included in the lithium ion secondary battery described previously is used as the electrode material.

Described in the following are Examples of the present invention. Needless to say, the technical scope of the present invention is not limited to the Examples described in the following as far as the subject matter of the present invention is not exceeded.

EXAMPLE 1

Reaction was carried out at room temperature for 6 hours between 4-chloro-1,3-dioxolan-2-one (compound A) and dimethyl ethyl amine (compound B) within acetonitrile. Then, acetonitrile was evaporated until the volume of the reaction mixture was decreased to ½ the original volume. Further, ethyl acetate was added to the reaction mixture, followed by filtering the resultant precipitate and subsequently drying the precipitate under a reduced pressure. In the next step, reaction was carried out at room temperature for 6 hours between the powder obtained by the drying under the reduced pressure and LiTFSI (compound C) within acetonitrile. The resultant precipitate was removed, and the acetonitrile solution was evaporated under a reduced pressure so as to obtain a room temperature molten salt represented by formula (11) given below.

Incidentally, it is possible to decrease the amount of the impurities contained in the room temperature molten salt by using AgTFSI in place of LITFSI (compound C).

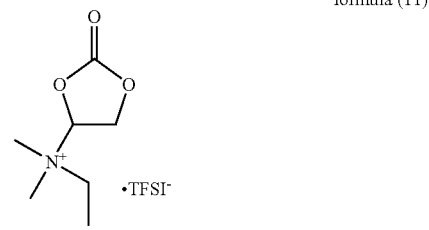

formula (11)

The room temperature molten salt represented by formula (11) was mixed with an additional room temperature molten salt (i.e., N,N-dimethyl-N-ethyl butyl ammonium·TFSI) such that the mixing ratio by volume of [the room temperature molten salt represented by formula (11)]: [N,N-dimethyl-N-ethyl butyl ammonium·TFSI] was set at 1:99, 5:95, and 50:50, so as to prepare mixed room temperature molten salts. Then, a nonaqueous electrolyte was prepared by dissolving LiTFSI in an amount of 1 mol/L in the mixed room temperature molten salts.

A lithium cobalt oxide (LiCoO$_2$) was used as a positive electrode active material. Then, a graphite powder having an interplanar spacing $d_{002}$ of 0.3355 nm of the (002) plane, which was used as an electronic conductor, was added to the positive electrode active material in an amount of 8% by weight based on the entire amount of the positive electrode. Also added to the positive electrode active material was polyvinylidene fluoride (PVdF) used as a binder in an amount of 5% by weight based on the entire amount of the positive electrode, followed by subjecting the resultant composition to a compression molding so as to obtain positive electrode pellets.

Also, a graphitized mesophase pitch based carbon fiber powder subjected to a heat treatment at 3,000° C., which had a interplanar spacing $d_{002}$ of 0.3370 nm of the (002) plane, was used as the negative electrode active material. Then, polyvinylidene fluoride (PVdF) used as a binder was added to the negative electrode active material in an amount of 6% by weight based on the entire amount of the negative electrode, followed by subjecting the resultant composition to a compression molding so as to obtain negative electrode pellets.

A polyethylene porous film used as a separator was impregnated with the nonaqueous electrolyte obtained as described above. Further, the separator, the positive electrode pellets, the negative electrode pellets, and an aluminum foil used as a positive electrode current collector were assembled so as to obtain a coin type lithium ion secondary battery constructed as shown in FIGURE and having a diameter of 20 mm and a height of 1.6 mm.

A charge-discharge cycle test was applied at 20° C. to the lithium ion secondary battery thus obtained within a range of not more than 4.2 V and not less than 2.7 V under the constant current of 0.1 mA/cm$^2$ so as to measure the initial charge-discharge efficiency and the capacity retention ratio at the 10$^{th}$ charge-discharge cycle of the secondary battery.

Incidentally, the ratio of the discharge capacity at the first charge-discharge cycle to the charge capacity at the first charge-discharge cycle was defined as the initial charge-discharge efficiency. Also, the ratio of the discharge capacity at the 10$^{th}$ charge-discharge cycle to the discharge capacity at the first charge-discharge cycle was defined as the capacity retention ratio at the 10$^{th}$ charge-discharge cycle.

EXAMPLE 2

A room temperature molten salt represented by formula (12) given below was obtained as in Example 1, except that 4-chloro-1,3-dioxolan-2-one and N-methyl pyrrolidine were used as compounds A and B, respectively:

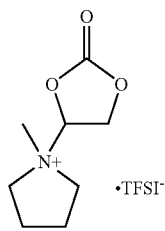

formula (12)

The room temperature molten salt represented by formula (12) was mixed with an additional room temperature molten salt (i.e., N-methyl-N-butyl pyrrolidinium·TFSI) such that the mixing ratio by volume of [the room temperature molten salt represented by formula (12)]: [N-methyl-N-butyl pyrrolidinium·TFSI] was set at 1:99, 5:95, and 50:50, so as to prepare mixed room temperature molten salts. Then, a nonaqueous electrolyte was prepared by dissolving LiTFSI in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 3

A room temperature molten salt represented by formula (13) given below was obtained as in Example 1, except that 4-chloro-1,3-dioxolan-2-one and N-methyl piperidine were used as compounds A and B, respectively:

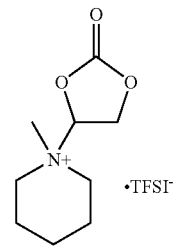

formula (13)

The room temperature molten salt represented by formula (13) was mixed with an additional room temperature molten salt (i.e., N-methyl-N-propyl piperidinium·TFSI) such that the mixing ratio by volume of [the room temperature molten salt represented by formula (13)]: [N-methyl-N-propyl piperidinium·TFSI] was set at 1:99, 5:95, and 50:50, so as to prepare mixed room temperature molten salts. Then, a nonaqueous electrolyte was prepared by dissolving LITFSI in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 4

A room temperature molten salt represented by formula (14) given below was obtained as in Example 1, except that 4-chloro-1,3-dioxolan-2-one, 1,2-dimethyl imidazole and AgBF$_4$ were used as compounds A, B and C, respectively:

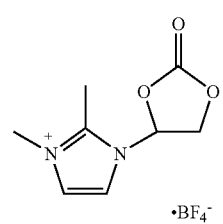

formula (14)

The room temperature molten salt represented by formula (14) was mixed with an additional room temperature molten salt (i.e., 1-ethyl-3-methyl imidazolium tetrafluoroborate) such that the mixing ratio by volume of [the room temperature molten salt represented by formula (14)]: [1-ethyl-3-methyl imidazolium tetrafluoroborate] was set at 1:99, 5:95, and 50:50, so as to prepare mixed room temperature molten salts. Then, a nonaqueous electrolyte was prepared by dissolving LiTFSI in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 5

A room temperature molten salt represented by formula (15) given below was obtained as in Example 1, except that 4-chloromethyl-1,3-dioxolan-2-one and N,N-dimethyl ethyl amine were used as compounds A and B, respectively:

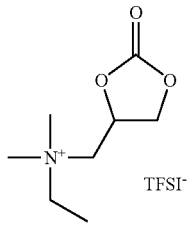

formula (15)

The room temperature molten salt represented by formula (15) was mixed with an additional room temperature molten salt (i.e., N,N-dimethyl-N-ethyl butyl ammonium·TFSI) such that the mixing ratio by volume of [the room temperature molten salt represented by formula (15)]: [N,N-dimethyl-N-ethyl butyl ammonium·TFSI] was set at 1:99, so as to prepare a mixed room temperature molten salts. Then, a nonaqueous electrolyte was prepared by dissolving LiTFSI in an amount of 1 mol/L in the mixed room temperature molten salts thus obtained. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 6

A room temperature molten salt represented by formula (16) given below was obtained as in Example 1, except that 4-chloro-1,3-dioxolan-2-one, N-methyl diethyl amine and AgTFSI were used as compounds A, B and C, respectively:

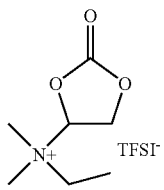

formula (16)

The room temperature molten salt represented by formula (16) was mixed with an additional room temperature molten salt (i.e., N,N-dimethyl-N-ethyl butyl ammonium·TFSI) such that the mixing ratio by volume of [the room temperature molten salt represented by formula (16)]: [N,N-dimethyl-N-ethyl butyl ammonium·TFSI] was set at 1:99, 5:95, and 50:50, so as to prepare mixed room temperature molten salts. Then, a nonaqueous electrolyte was prepared by dissolving LITFSI in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 7

A room temperature molten salt represented by formula (17) given below was obtained as in Example 1, except that 4-chloro-1,3-dioxolan-2-one, N,N-dimethyl propyl amine and AgTFSI were used as compounds A, B and C, respectively:

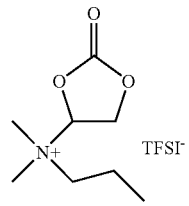

formula (17)

The room temperature molten salt represented by formula (17) was mixed with an additional room temperature molten salt (i.e., N,N-dimethyl-N-ethyl butyl ammonium·TFSI) such that the mixing ratio by volume of [the room temperature molten salt represented by formula (17)]: [N,N-dimethyl-N-ethyl butyl ammonium·TFSI] was set at 1:99, 5:95, and 50:50, so as to prepare mixed room temperature molten salts. Then, a nonaqueous electrolyte was prepared by dissolving LiTFSI in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 8

A room temperature molten salt represented by formula (18) given below was obtained as in Example 1, except that 4-chloro-1,3-dioxolan-2-one, N,N-dimethyl butyl amine and AgTFSI were used as compounds A, B and C, respectively:

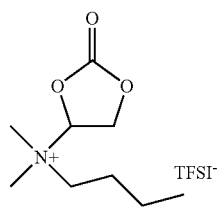

formula (18)

The room temperature molten salt represented by formula (18) was mixed with an additional room temperature molten salt (i.e., N,N-dimethyl-N-ethyl butyl ammonium·TFSI) such that the mixing ratio by volume of [the room temperature molten salt represented by formula (18)]: [N,N-dimethyl-N-ethyl butyl ammonium·TFSI] was set at 1:99, 5:95, and 50:50, so as to prepare mixed room temperature molten salts. Then, a nonaqueous electrolyte was prepared by dissolving LiTFSI in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 9

A room temperature molten salt represented by formula (19) given below was obtained as in Example 1, except that 4-chloro-1,3-dioxolan-2-one, N,N-dimethyl ethyl amine and AgBETI were used as compounds A, B and C, respectively:

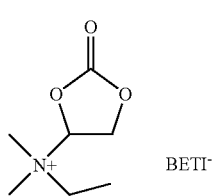

formula (19)

The room temperature molten salt represented by formula (19) was mixed with an additional room temperature molten salt (i.e., N,N-dimethyl-N-ethyl butyl ammonium·BETI) such that the mixing ratio by volume of [the room temperature molten salt represented by formula (19)]: [N,N-dimethyl-N-ethyl butyl ammonium·BETI] was set at 1:99, 5:95, and 50:50, so as to prepare mixed room temperature molten salts. Then, a nonaqueous electrolyte was prepared by dissolving LiBETI in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 10

A room temperature molten salt represented by formula (20) given below was obtained as in Example 1, except that 4-chloro-1,3-dioxolan-2-one, 1,2-dimethyl imidazole and AgBETI were used as compounds A, B and C, respectively:

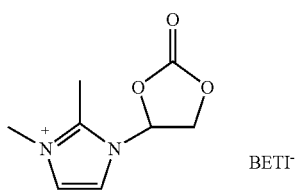

formula (20)

The room temperature molten salt represented by formula (20) was mixed with an additional room temperature molten salt (i.e., 1,2-dimethyl-3-ethyl imidazolium·BETI) such that the mixing ratio by volume of [the room temperature molten salt represented by formula (20)]: [1,2-dimethyl-3-ethyl imidazolium·BETI] was set at 1:99, 5:95, and 50:50, so as to prepare mixed room temperature molten salts. Then, a nonaqueous electrolyte was prepared by dissolving LiBETI in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 11

A room temperature molten salt represented by formula (21) given below was obtained as in Example 1, except that 4-chloro-1,3-dioxolan-2-one, 1,2-dimethyl imidazole and AgTFSI were used as compounds A, B and C, respectively:

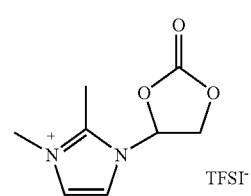

formula (21)

The room temperature molten salt represented by formula (21) was mixed with an additional room temperature molten salt (i.e., 1,2-dimethyl-3-ethyl imidazolium·TFSI) such that the mixing ratio by volume of [the room temperature molten salt represented by formula (21)]: [1,2-dimethyl-3-ethyl imidazolium·TFSI] was set at 1:99, 5:95, and 50:50, so as to prepare mixed room temperature molten salts. Then, a nonaqueous electrolyte was prepared by dissolving LITFSI in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 12

A room temperature molten salt represented by formula (22) given below was obtained as in Example 1, except that 4-chloro-1,3-dioxolan-2-one, N,N-dimethyl ethyl amine and AgBETI were used as compounds A, B and C, respectively:

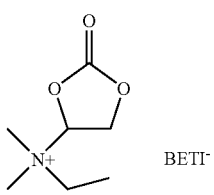

formula (22)

The room temperature molten salt represented by formula (22) was mixed with an additional room temperature molten salt (i.e., 1,2-dimethyl-3-ethyl imidazolium·BETI) such that the mixing ratio by volume of [the room temperature molten salt represented by formula (22)]: [1,2-dimethyl-3-ethyl imidazolium·BETI] was set at 1:99, 5:95, and 50:50, so as to prepare mixed room temperature molten salts. Then, a nonaqueous electrolyte was prepared by dissolving LiBETI in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 13

The room temperature molten salt represented by formula (11) was mixed with an additional room temperature molten salt (i.e., N,N-dimethyl-N-ethyl butyl ammonium·TFSI) such that the mixing ratio by volume of [the room temperature molten salt represented by formula (11)]: [N,N-dimethyl-N-ethyl butyl ammonium·TFSI] was set at 5:95, and 50:50, so as to prepare mixed room temperature molten salts. Then, a nonaqueous electrolyte was prepared by dissolving LIBOB in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 14

The room temperature molten salt represented by formula (14) was mixed with an additional room temperature molten salt (i.e., 1,2-dimethyl-3-ethyl imidazolium tetrafluoroborate) such that the mixing ratio by volume of [the room temperature molten salt represented by formula (14)]: [1,2-dimethyl-3-ethyl imidazolium tetrafluoroborate] was set at 5:95, and 50:50, so as to prepare mixed room temperature molten salts. Then, a nonaqueous electrolyte was prepared by dissolving LIBOB in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 15

The room temperature molten salt represented by formula (20) was mixed with an additional room temperature molten salt (i.e., 1,2-dimethyl-3-ethyl imidazolium BETI) such that the mixing ratio by volume of [the room temperature molten salt represented by formula (20)]: [1,2-dimethyl-3-ethyl imidazolium·BETI] was set at 5:95, and 50:50, so as to prepare mixed room temperature molten salts. Then, a nonaqueous electrolyte was prepared by dissolving LiBOB in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

EXAMPLE 16

A room temperature molten salt represented by formula (23) given below was obtained as in Example 1, except that 2-chloroethyl methyl carbonate, N,N-dimethyl ethyl amine and AgBETI were used as compounds A, B and C, respectively:

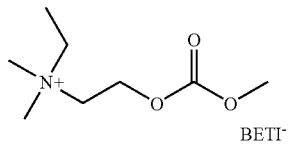

formula (23)

The room temperature molten salt represented by formula (23) was mixed with an additional room temperature molten salt (i.e., N,N-dimethyl-N-ethyl butyl ammonium·BETI) such that the mixing ratio by volume of [the room temperature molten salt represented by formula (23)]: [N,N-dimethyl-N-ethyl butyl ammonium·BETI] was set at 5:95, and 50:50, so as to prepare mixed room temperature molten salts. Then, a nonaqueous electrolyte was prepared by dissolving LiBOB in an amount of 1 mol/L in the mixed room temperature molten salts. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

COMPARATIVE EXAMPLE 1

A lithium ion secondary battery was manufactured and a charge-discharge cycle test was applied to the secondary battery thus manufactured as in Example 1, except that a nonaqueous electrolyte was prepared by dissolving the lithium salt equal to that used in Example 1 in a room temperature molten salt represented by formula (11) in an amount of 1 mol/L.

COMPARATIVE EXAMPLE 2

A lithium ion secondary battery was manufactured and a charge-discharge cycle test was applied to the secondary battery thus manufactured as in Example 2, except that a nonaqueous electrolyte was prepared by dissolving the lithium salt equal to that used in Example 2 in a room temperature molten salt represented by formula (12) in an amount of 1 mol/L.

COMPARATIVE EXAMPLE 3

A lithium ion secondary battery was manufactured and a charge-discharge cycle test was applied to the secondary battery thus manufactured as in Example 3, except that a nonaqueous electrolyte was prepared by dissolving the lithium salt equal to that used in Example 3 in a room temperature molten salt represented by formula (13) in an amount of 1 mol/L.

COMPARATIVE EXAMPLE 6

A lithium ion secondary battery was manufactured and a charge-discharge cycle test was applied to the secondary battery thus manufactured as in Example 6, except that a nonaqueous electrolyte was prepared by dissolving the lithium salt equal to that used in Example 6 in a room temperature molten salt represented by formula (16) in an amount of 1 mol/L.

COMPARATIVE EXAMPLE 7

A lithium ion secondary battery was manufactured and a charge-discharge cycle test was applied to the secondary battery thus manufactured as in Example 7, except that a nonaqueous electrolyte was prepared by dissolving the lithium salt equal to that used in Example 7 in a room temperature molten salt represented by formula (17) in an amount of 1 mol/L.

COMPARATIVE EXAMPLE 8

A lithium ion secondary battery was manufactured and a charge-discharge cycle test was applied to the secondary battery thus manufactured as in Example 8, except that a nonaqueous electrolyte was prepared by dissolving the lithium salt equal to that used in Example 8 in a room temperature molten salt represented by formula (18) in an amount of 1 mol/L.

COMPARATIVE EXAMPLE 9

A lithium ion secondary battery was manufactured and a charge-discharge cycle test was applied to the secondary battery thus manufactured as in Example 9, except that a nonaqueous electrolyte was prepared by dissolving the lithium salt equal to that used in Example 9 in a room temperature molten salt represented by formula (19) in an amount of 1 mol/L.

COMPARATIVE EXAMPLE 10

A lithium ion secondary battery was manufactured and a charge-discharge cycle test was applied to the secondary battery thus manufactured as in Example 10, except that a nonaqueous electrolyte was prepared by dissolving the lithium salt equal to that used in Example 10 in a room temperature molten salt represented by formula (20) in an amount of 1 mol/L.

COMPARATIVE EXAMPLE 11

A lithium ion secondary battery was manufactured and a charge-discharge cycle test was applied to the secondary battery thus manufactured as in Example 11, except that a nonaqueous electrolyte was prepared by dissolving the lithium salt equal to that used in Example 11 in a room temperature molten salt represented by formula (21) in an amount of 1 mol/L.

COMPARATIVE EXAMPLE 12

A lithium ion secondary battery was manufactured and a charge-discharge cycle test was applied to the secondary battery thus manufactured as in Example 12, except that a nonaqueous electrolyte was prepared by dissolving the lithium salt equal to that used in Example 12 in a room temperature molten salt represented by formula (22) in an amount of 1 mol/L.

COMPARATIVE EXAMPLE 13

A lithium ion secondary battery was manufactured and a charge-discharge cycle test was applied to the secondary battery thus manufactured as in Example 13, except that a nonaqueous electrolyte was prepared by dissolving the lithium salt equal to that used in Example 13 in a room temperature molten salt represented by formula (11) in an amount of 1 mol/L.

COMPARATIVE EXAMPLE 15

A lithium ion secondary battery was manufactured and a charge-discharge cycle test was applied to the secondary battery thus manufactured as in Example 15, except that a nonaqueous electrolyte was prepared by dissolving the lithium salt equal to that used in Example 15 in a room temperature molten salt represented by formula (20) in an amount of 1 mol/L.

COMPARATIVE EXAMPLE 17

A nonaqueous electrolyte was prepared by dissolving LiTFSI in an amount of 1 mol/L in the additional room temperature molten salt of dimethyl ethyl butyl ammonium·TFSI. Then, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

However, the charging current was not converged in the initial charging stage so that make it impossible to measure the charging capacity and the charge-discharge efficiency of the secondary battery. Such being the situation, the apparent capacity retention ratio at the $10^{th}$ charge-discharge cycle was measured, with the charging time set as in Example 1.

COMPARATIVE EXAMPLE 18

A solution was prepared by mixing vinylene carbonate (VC) with the additional room temperature molten salt of dimethyl ethyl butyl ammonium ·TFSI, such that the mixing ratio by volume of [vinylene carbonate (VC)]: [dimethyl ethyl butyl ammonium·TFSI] was set at 1:99, 5:95 and 50:50. Then, a nonaqueous electrolyte was prepared by dissolving LiTFSI in an amount of 1 mol/L in the solution thus prepared. Further, a lithium ion secondary battery was manufactured and a charge-discharge cycle test was applied to the lithium ion secondary battery thus manufactured as in Example 1, except that the nonaqueous electrolyte thus prepared was used in manufacturing the lithium ion secondary battery.

After completion of a charge-discharge cycle test, the lithium ion secondary battery for Comparative Example 18 was dismantled so as to recover the nonaqueous electrolyte prepared by adding 50% by volume of VC to the additional room temperature molten salt. The nonaqueous electrolyte thus recovered was analyzed by using GC (gas chromatography). About 70% of the VC added to the additional room temperature molten salt was found to be left unreacted.

Tables 1 and 2 show the results of the charge-discharge cycle test for Examples 1 to 16 and Comparative Examples 1 to 18. The initial charge-discharge efficiency is shown in Table 1, and the capacity retention ratio at the $10^{th}$ charge-discharge cycle is shown in Table 2. Incidentally, the symbol of "- (bar)" in each of Tables 1 and 2 denotes that the experimental data was not measured. Also, in the Tables 1 and 2, the mixing ratio by volume of "1:99" for the room temperature molten salt for Examples 1 to 16 indicate that the mixing ratio of the room temperature molten salt containing the cation represented by formula (1) or formula (2) was 1% by volume, and the mixing ratio of the additional room temperature molten salt was 99% by volume. On the other hand, the mixing ratio by volume of "1:99" for the room temperature molten salt for Comparative Example 18 indicates that the mixing ratio of VC was 1% by volume and the mixing ratio of the additional room temperature molten salt was 99% by volume.

Large Current Discharge Test:

A charge-discharge cycle test was applied as in Example 1 to the lithium ion secondary battery for Example 1 in which the mixing ratio by volume of room temperature molten salt was set at 5:95, except that the discharge current value was set at 0.5 mA/cm² so as to measure the discharge capacity at the first charge-discharge cycle. Also, the discharge capacity was measured similarly in respect of the lithium ion secondary battery for Example 3.

Table 3 shows the discharge capacity for the first charge-discharge cycle in respect of the secondary battery for each of Examples 1 and 3 in which the mixing ratio by volume of room temperature molten salt was set at 5:95, covering the cases where the discharge current values were set at 0.1 mA/cm² and 0.5 mA/cm². In Table 3, the discharge capacity of the secondary battery for Example 1, covering the case where the discharge current value was set at 0.1 mA/cm², was set at 100%.

TABLE 1

Initial charge-discharge efficiency (%)
Mixing ratio by volume of room temperature molten salt

| | 1:99 | 5:95 | 50:50 | 100:0 | 0:100 |
|---|---|---|---|---|---|
| | Example | | | Comparative Example | |
| No. 1 | 93 | 96 | 88 | 76 | — |
| No. 2 | 90 | 95 | 85 | 66 | — |
| No. 3 | 92 | 93 | 86 | 65 | — |
| No. 4 | 85 | 90 | — | — | — |
| No. 5 | 65 | — | — | — | — |
| No. 6 | 92 | 93 | 86 | 68 | — |
| No. 7 | 92 | 90 | 88 | 75 | — |
| No. 8 | 78 | 83 | 88 | 74 | — |
| No. 9 | 84 | 89 | 87 | 79 | — |
| No. 10 | 82 | 86 | 89 | 52 | — |
| No. 11 | 85 | 88 | 86 | 45 | — |
| No. 12 | 80 | 89 | 88 | 79 | — |
| No. 13 | — | 75 | 73 | 56 | — |
| No. 14 | — | 73 | 71 | — | — |
| No. 15 | — | 79 | 76 | 52 | — |
| No. 16 | — | 70 | 68 | — | — |
| | Comparative Example | | | | |
| No. 17 | — | — | — | — | Impossible to measure |
| No. 18 | 50 | 72 | 93 | — | — |

TABLE 2

Capacity retention ratio at 10$^{th}$ cycle (%)
Mixing ratio by volume of room temperature molten salt

| | 1:99 | 5:95 | 50:50 | 0:100 |
|---|---|---|---|---|
| | Example | | | Comparative Example |
| No. 1 | 92 | 96 | 82 | — |
| No. 2 | 90 | 97 | 81 | — |
| No. 3 | 91 | 95 | 78 | — |
| No. 4 | 75 | 80 | — | — |
| No. 5 | 35 | — | — | — |
| No. 6 | 90 | 94 | 79 | — |
| No. 7 | 90 | 92 | 77 | — |
| No. 8 | 85 | 89 | 74 | — |
| No. 9 | 88 | 94 | 82 | — |
| No. 10 | 75 | 86 | 86 | — |
| No. 11 | 79 | 90 | 84 | — |
| No. 12 | 78 | 85 | 80 | — |
| No. 13 | — | 96 | 89 | — |
| No. 14 | — | 92 | 85 | — |
| No. 15 | — | 95 | 90 | — |
| No. 16 | — | 88 | 70 | — |
| No. 17 | — | — | — | 5 |
| No. 18 | 27 | 58 | 90 | — |

TABLE 3

| | Discharge capacity for the first charge-discharge cycle (%) | |
|---|---|---|
| | Discharge current value 0.1 mA/cm² | Discharge current value 0.5 mA/cm² |
| Example 1 | 100 | 69 |
| Example 3 | 97 | 79 |

As apparent from Tables 1 and 2, the comparison between Examples 1 to 16 and Comparative Example 17 clearly supports that, if the room temperature molten salt containing the cation represented by formula (1) or formula (2) is added, it is possible to improve the initial charge-discharge efficiency and the capacity retention ratio at the 10$^{th}$ charge-discharge cycle of the secondary battery.

Incidentally, if the mixing amount of the room temperature molten salt containing the cation represented by formula (1) or formula (2) is increased to 50% by volume, the initial charge-discharge efficiency and the capacity retention ratio at the 10$^{th}$ charge-discharge cycle of the secondary battery tend to be somewhat lowered. It is considered reasonable to understand that, if the mixing amount of the room temperature molten salt containing the cation represented by formula (1) or formula (2) is set at 50% by volume, the viscosity of the nonaqueous electrolyte is increased so that the ionic conductivity of the nonaqueous electrolyte is lowered, with the result that the initial charge-discharge efficiency and the capacity retention ratio were somewhat lowered as pointed out above. It is possible to obtain particularly prominent charge-discharge cycle characteristics of the second battery if the mixing ratio of the room temperature molten salt containing the cation represented by formula (1) or formula (2) is smaller than 50% by volume.

The room temperature molten salt used in each of Examples 1 and 5 contains the cation represented by formula (1) in which $R^1$ denotes the substituent represented by formula (4). As apparent from the comparison between Examples 1 and 5, particularly prominent charge-discharge cycle characteristics can be obtained in the case where "m" in formula (4) is zero (0).

The nonaqueous electrolyte used in the secondary battery for Example 3 contained the room temperature molten salt having the cation, in which $R^2$ and $R^3$ were combined to be a cyclic alkyl group or a cyclic ether group. On the other hand, the nonaqueous electrolyte used in the secondary battery for Example 1 contained the room temperature molten salt having the cation, in which each of $R^2$ and $R^3$ was an alkyl group, an ether group or an ester group. As apparent from Table 3, the initial discharge capacity during the large current discharge stage of the secondary battery for Example 3 was found to be larger than that of the secondary battery for Example 1.

The nonaqueous electrolyte used in the secondary battery disclosed in Jpn. Pat. Appln. KOKAI Publication No. 2005-149982 does not contain the additional room temperature molten salt described in respect to the first embodiment of the present invention. Likewise, the nonaqueous electrolyte used in the secondary battery for each of Comparative Examples 1 to 15 did not contain the additional room temperature molten salt, with the result that the initial charge-discharge efficiency of the secondary battery for each of these Comparative Examples was found to be lower than that of the secondary battery for the Examples of the present invention. Incidentally, it can be understood that, since the initial charge-discharge efficiency was lowered, the capacity retention ratio at the $10^{th}$ cycle was also lowered in the secondary battery for each of Comparative Examples 1 to 15. Such being the situation, the capacity retention ratio at the $10^{th}$ cycle was not measured for the secondary battery for each of the Comparative Examples noted above.

Also, the initial discharge capacity of the secondary battery for Comparative Example 1 was not higher than 30% of that of the secondary battery for Example 1 in which the room temperature molten salt containing the cation represented by formula (1) or formula (2) was contained in an amount of 5% by volume of the nonaqueous electrolyte. The initial discharge capacity for the secondary battery for each of Comparative Examples 3 and 10 were found to be similar to that for the secondary battery for Comparative Example 1. It is considered reasonable to understand that the initial discharge capacity of the secondary battery for each of these Comparative Examples was lowered because the nonaqueous electrolyte used in these Comparative Examples did not contain the additional room temperature molten salt so that the viscosity of the nonaqueous electrolyte was markedly elevated.

In Comparative Example 17, the room temperature molten salt containing the cation represented by formula (1) or formula (2) was not added for preparing the nonaqueous electrolyte in spite of the situation that a substance having a lamellar crystal structure was used as the positive electrode electronic conductor and as the negative electrode active material. It is considered reasonable to understand that a film was not formed on the surface of the negative electrode because the room temperature molten salt containing the cation represented by formula (1) or formula (2) was not added in preparing the nonaqueous electrolyte and, thus, in the initial charging stage, the decomposition reaction was generated in the cationic component contained in the additional room temperature molten salt in preference to the charging reaction, so that the charging current was not converged. As a result, in charging stages, it was hardly possible to charge the negative electrode active material.

The result from the comparison between Examples 1 to 16 and Comparative Example 18 will now be described.

As apparent from Examples 1 to 16, the effect of the present invention can be obtained even if the room temperature molten salt containing the cation represented by formula (1) or formula (2) is contained in the nonaqueous electrolyte in an amount of only 1% by volume. Specifically, each of the initial charge-discharge efficiency and the capacity retention ratio at the $10^{th}$ charge-discharge cycle of the secondary battery for each of Examples 1 to 16 was found to be higher than that for Comparative Example 18. On the other hand, it was impossible for the secondary battery for Comparative Example 18 to be substantially equal to that for Examples 1 to 16 in each of the initial charge-discharge efficiency and the capacity retention ratio at the $10^{th}$ charge-discharge cycle of the secondary battery, unless 50% by volume of VC is added in preparing the nonaqueous electrolyte.

It should be noted in this connection that the cationic component serves to form a film on the surface of the positive electrode or the negative electrode in each of Examples 1 to 16. The cationic component is migrated to the negative electrode or the positive electrode in accordance with the charge or discharge of the secondary battery so as to carry out the reaction with the negative electrode or the positive electrode efficiently. Specifically, in the initial charging stage, the cationic component was migrated to the negative electrode so as to form the excellent film on the surface of the negative electrode of the secondary battery for Examples 1 to 16. On the other hand, VC molecule serves to form a film on the surface of the electrode in Comparative Example 18. In this case, the VC molecule, which is migrated by only the convection to a region in the vicinity of the negative electrode, is allowed to perform the reaction with the negative electrode. Therefore, the film formation conforming to the VC addition amount does not proceed efficiently. Such being the situation, an addition of VC in excess is needed to form excellent film. What should be noted is that, in Comparative Example 18, VC, which is a combustible substance, was contained in a large amount in the nonaqueous electrolyte so that the incombustibility of the nonaqueous electrolyte was impaired.

The combustible substance can be confirmed by using, for example, a TG-MS (thermogravimetric-mass spectrometer) or a thermal decomposition MS (mass spectrometer). To be more specific, the generation of the combustible component can be detected by heating a sample of the nonaqueous electrolyte and analyzing the generated gas.

Incidentally, the volume ratio of the nonaqueous electrolyte can be measured by using a GC, an NMR (nuclear magnetic resonance spectroscopy), etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrochemical device, comprising:
a case;
a nonaqueous electrolyte filled in the case and containing a room temperature molten salt in an amount of not smaller than 1% to not larger than 50% by volume, the room temperature molten salt containing a cation represented by formula (1) or formula (2) given below;
a first electrode housed in the case; and
a second electrode housed in the case and containing a substance having a lamellar crystal structure,

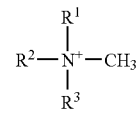

formula (1)

where $R^1$ denotes a substituent including a carbonic acid ester group; and each of $R^2$ and $R^3$ denotes a substituent having an acyclic structure and having 4 or less carbon atoms, or $R^2$ and $R^3$ are combined to denote a substituent having a cyclic structure and having not less than 4 to not more than 5 carbon atoms;

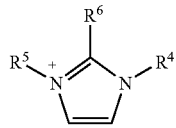

formula (2)

where $R^4$ denotes a substituent including a carbonic acid ester group, $R^5$ denotes a substituent having an acyclic structure and having 4 or less carbon atoms, and $R^6$ denotes a hydrogen atom or a methyl group;

wherein $R^1$ and $R^4$ denotes a substituent represented by formula (4) given below:

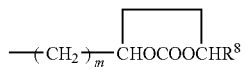

formula (4)

where m is 0 or 1, and $R^8$ denotes a hydrogen atom.

2. The electrochemical device according to claim 1, wherein $R^1$ or $R^4$ denotes a substituent represented by formula (4) given below:

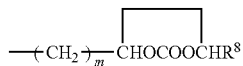

formula (4)

where m is 0, and R8 denotes a hydrogen atom.

3. The electrochemical device according to claim 1, wherein each of $R^2$ and $R^3$ denotes a substituent selected from the group consisting of an alkyl group, an ether group and an ester group; or $R^2$ and $R^3$ are combined to denote a substituent selected from the group consisting of a cyclic alkyl group and a cyclic ether group.

4. The electrochemical device according to claim 1, wherein $R^2$ denotes a substituent selected from the group consisting of a methyl group, an ethyl group, a propyl group, an isopropyl group, a (2-methoxy) propyl group, a butyl group, an isobutyl group, a sec-butyl group and a tert-butyl group, and $R^3$ denotes a substituent selected from the group consisting of a methyl group and an ethyl group; or $R^2$ and $R^3$ are combined to denote a substituent selected from the group consisting of a pyrrolidyl group and a piperidyl group.

5. An electrochemical device, comprising:
a case;
a nonagueous electrolyte filled in the case and containing a room temperature molten salt in an amount of not smaller than 1% to not larger than 50% by volume, the room temperature molten salt containing a cation represented by formula (1) or formula (2) given below;
a first electrode housed in the case; and
a second electrode housed in the case and containing a substance having a lamellar crystal structure,

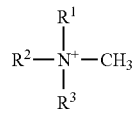

formula (1)

where $R^1$ denotes a substituent including a carbonic acid ester group; and each of $R^2$ and $R^3$ denotes a substituent having an acyclic structure and having 4 or less carbon atoms, or $R^2$ and $R^3$ are combined to denote a substituent having a cyclic structure and having not less than 4 to not more than 5 carbon atoms;

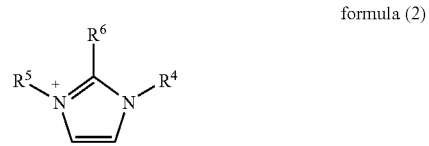

formula (2)

where $R^4$ denotes a substituent including a carbonic acid ester group, $R^5$ denotes a substituent having an acyclic structure and having 4 or less carbon atoms, and $R^6$ denotes a hydrogen atom or a methyl group;

wherein $R^2$ denotes a substituent selected from the group consisting of a methyl group, an ethyl group, a propyl group, an isopropyl group, a (2-methoxy) propyl group, a butyl group, an isobutyl group, a sec-butyl group and a tert-butyl group, and $R^3$ denotes a substituent selected from the group consisting of a methyl group and an ethyl group; or $R^2$ and $R^3$ are combined to denote a substituent selected from the group consisting of a pyrrolidyl group and a piperidyl group; and $R^1$ denotes a substituent represented by formula (4) given below:

formula (4)

where m is 0 or 1, and $R^8$ denotes a hydrogen atom.

6. The electrochemical device according to claim 5, wherein $R^2$ denotes a substituent selected from the group consisting of a methyl group, an ethyl group, a propyl group, an isopropyl group, a (2-methoxy) propyl group, a butyl group, an isobutyl group, a sec-butyl group and a tert-butyl group, and $R^3$ denotes a substituent selected from the group consisting of a methyl group and an ethyl group; or $R^2$ and $R^3$ are combined to denote a substituent selected from the group consisting of a pyrrolidyl group and a piperidyl group; and $R^1$ denotes a substituent represented by formula (4) given below:

formula (4)

where m is 0, and $R^8$ denotes a hydrogen atom.

7. The electrochemical device according to claim 1, wherein $R^2$ denotes a substituent selected from the group consisting of a methyl group, an ethyl group, a propyl group, an isopropyl group, a (2-methoxy) propyl group, a butyl group, an isobutyl group, a sec-butyl group and a tert-butyl group, and $R^3$ denotes a substituent selected from the group consisting of a methyl group and an ethyl group; or $R^2$ and $R^3$ are combined to denote a substituent selected from the group consisting of a pyrrolidyl group and a piperidyl group; and $R^1$ denotes a substituent represented by formula (3) given below:

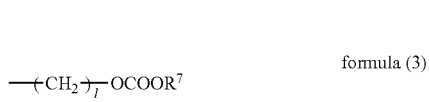

formula (3)

where l is 1 or 2, and $R^7$ denotes a methyl group or an ethyl group.

8. The electrochemical device according to claim 1, wherein $R^5$ denotes a methyl group.

9. An electrochemical device, comprising:

a case;

a nonaqueous electrolyte filled in the case and containing a room temperature molten salt in an amount of not smaller than 1% to not larger than 50% by volume, the room temperature molten salt containing a cation represented by formula (1) or formula (2) given below;

a first electrode housed in the case; and a second electrode housed in the case and containing a substance having a lamellar crystal structure;

formula (1)

where $R^1$ denotes a substituent including a carbonic acid ester group; and each of $R^2$ and $R^3$ denotes a substituent having an acyclic structure and having 4 or less carbon atoms, or $R^2$ and $R^3$ are combined to denote a substituent having a cyclic structure and having not less than 4 to not more than 5 carbon atoms;

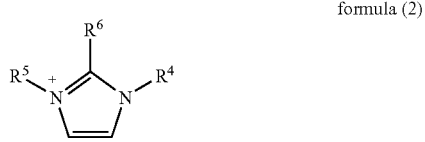

formula (2)

where $R^4$ denotes a substituent including a carbonic acid ester group, $R^5$ denotes a substituent having an acyclic structure and having 4 or less carbon atoms, and $R^6$ denotes a hydrogen atom or a methyl group;

wherein $R^5$ denotes a methyl group, and $R^4$ denotes a substituent represented by formula (4) given below:

formula (4)

where m is 0 or 1, and $R^8$ denotes a hydrogen atom.

10. The electrochemical device according to claim 9, wherein $R^5$ denotes a methyl group, and $R^4$ denotes a substituent represented by formula (4)

formula (4)

given below:

where m is 0, and $R^8$ denotes a hydrogen atom.

11. An electrochemical device, comprising:

a case;

a nonaqueous electrolyte filled in the case and containing a room temperature molten salt in an amount of not smaller than 1% to not larger than 50% by volume, the room temperature molten salt containing a cation represented by formula (1) or formula (2) given below;

a first electrode housed in the case; and a second electrode housed in the case and containing a substance having a lamellar crystal structure,

formula (1)

where $R^1$ denotes a substituent including a carbonic acid ester group; and each of $R^2$ and $R^3$ denotes a substituent having an acyclic structure and having 4 or less carbon atoms, or $R^2$ and $R^3$ are combined to denote a substituent having a cyclic structure and having not less than 4 to not more than 5 carbon atoms;

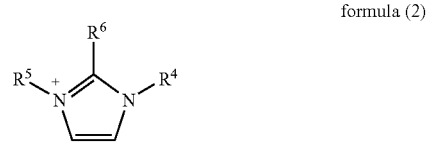

formula (2)

where $R^4$ denotes a substituent including a carbonic acid ester group, $R^5$ denotes a substituent having an acyclic structure and having 4 or less carbon atoms, and $R^6$ denotes a hydrogen atom or a methyl group;

wherein $R^5$ denotes a methyl group, and $R^4$ denotes a substituent represented by formula (3) given below:

formula (3)

where l is 1 or 2, and $R^7$ denotes a methyl group or an ethyl group.

12. The electrochemical device according to claim 1, wherein $R^2$ and $R^3$ are combined to denote a substituent selected from the group consisting of a cyclic alkyl group and a cyclic ether group.

13. The electrochemical device according to claim 1, wherein the substance having a lamellar crystal structure is a carbonaceous material.

14. The electrochemical device according to claim 1, wherein one of the first and second electrodes is a positive electrode and the other is a negative electrode, and the nonaqueous electrolyte further contains lithium ions.

15. The electrochemical device according to claim 1, wherein the first electrode is a positive electrode, the second electrode is a negative electrode, the substance having a lamellar crystal structure is a carbonaceous material and is used as a negative electrode active material, and the nonaqueous electrolyte further contains lithium ions.

16. The electrochemical device according to claim 1, wherein the second electrode is positioned spatially apart from the first electrode.

17. The electrochemical device according to claim 1, wherein the nonaqueous electrolyte further contains lithium salts and an additional room temperature molten salt containing an organic cation selected from the group consisting of N,N,N-trimethyl butyl ammonium ion, N-ethyl-N,N-dimethyl propyl ammonium ion, N-ethyl-N,N-dimethyl butyl ammonium ion, N,N-dimethyl-N-propyl butyl ammonium ion, N-(2-methoxy ethyl)-N,N-dimethyl ethyl ammonium ion, 1-ethyl-3-methyl imidazolium ion, 1-methyl-3-propyl imidazolium ion, 1-butyl-3-methyl imidazolium ion, 1-ethyl-2,3-dimethyl imidazolium ion, 1-ethyl-3,4-dimethyl imidazolium ion, 1-ethyl-2,3,4-trimethyl imidazolium ion, 1-ethyl-2,3,5-trimethyl imidazolium ion, N-methyl-N-propyl pyrrolidinium ion, N-butyl-N-methyl pyrrolidinium ion, N-sec-butyl-N-methyl pyrrolidinium ion, N-(2-methoxy ethyl)-N-methyl pyrrolidinium ion, N-(2-ethoxy ethyl)-N-methyl pyrrolidinium ion, N-methyl-N-propyl piperidinium ion, N-butyl-N-methyl piperidinium ion, N-sec-butyl-N-methyl piperidinium ion, N-(2-methoxy ethyl)-N-methyl piperidinium ion, and N-(2-ethoxy ethyl)-N-methyl piperidinium ion.

18. The electrochemical device according to claim 1, wherein the room temperature molten salt contains an anion selected from the group consisting of $BF_4^-$, $[BF_3(CF_3)]^-$, $[BF_3(C_2F_5)]^-$, $[B(COOCOO)_2]^-$, $[(CF_3SO_2)_2N]^-$, and $[(C_2F_5SO_2)_2N]^-$.

* * * * *